is not in print.
PATENTED JUNE 20, 1836.
J. BARLEY & J. SPRINKLE.
9741X
THRESHING MACHINE.
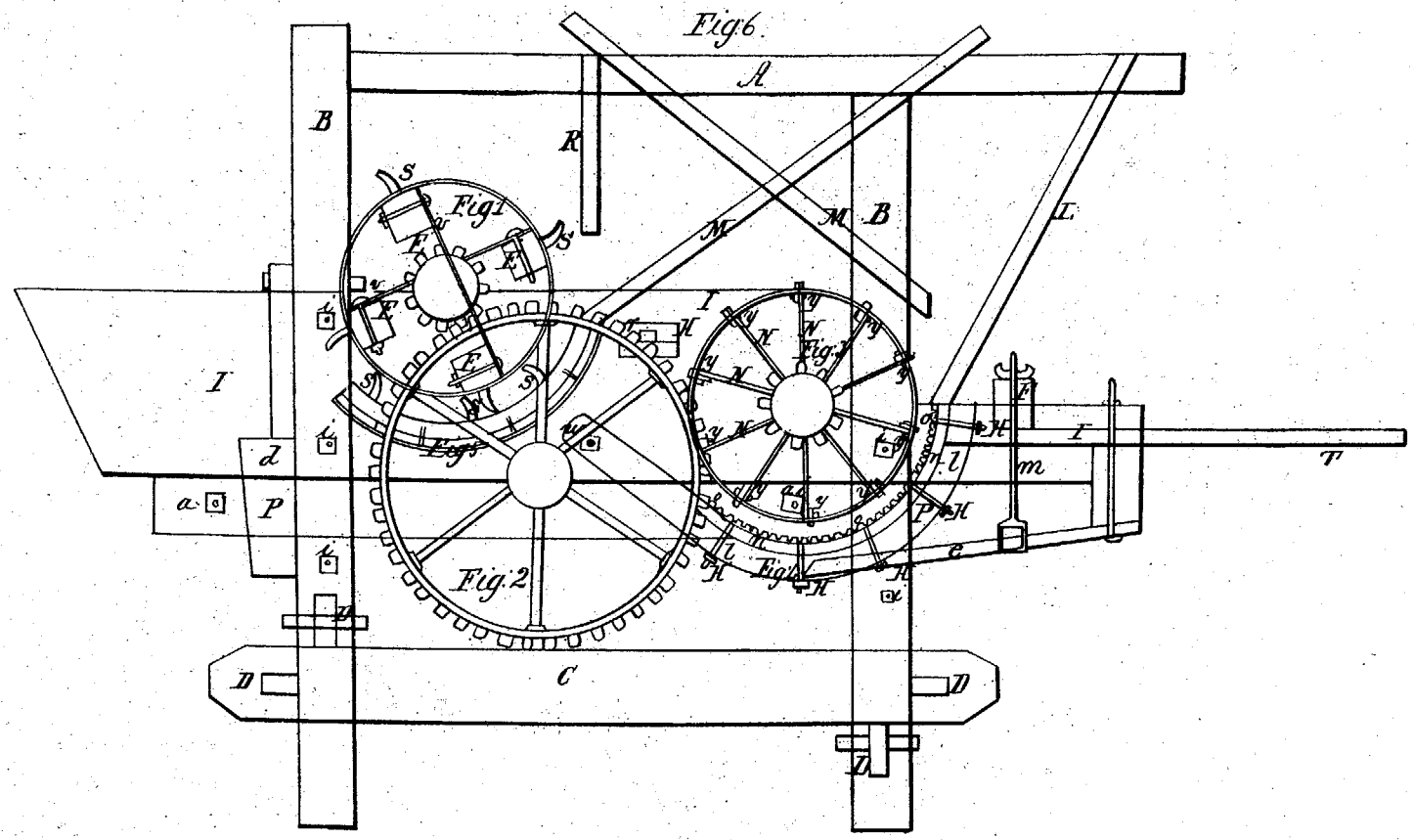
THE J. WISON PICTURES CO., PHOTO-LITHO., WASHINGTON, D. C.

9741 X

Jacob Barley and John Sprinkle
[illegible] Patent

The schedule referred to in these letters Patent and making part of the same con-
taining a description in the words of the said Jacob Barley and John Sprinkle themselves
of their improvement in the machine for Thrashing wheat and clover seed"

---

To all to whom these presents shall come. Be it known that we Jacob Barley and John
Sprinkle of the County of Rockingham and State of Virginia have invented a new and
useful wheat and clover seed Thrashing Machine and that the following is a full and
exact description thereof. The improved Thrashing machine for thrashing all kinds of
small grain as wheat Rye and Oats also clover seed off the stalk and out of the head.
consists of a Thrash box, Two spur cylinders, Two [illegible] cog wheel and pinions or band
wheel and pullies. Figure Represents the thrash box consisting of four posts B.B.
B.B. the two front posts each four feet eight inches in height and four inches
square; the two back posts each four feet two inches in height also four inches
square, two side plank I.I. each six feet ten inches in length three inches thick thir-
teen inches in width until within three inches of the centre of the notched bar cylinder
Fig 3 from thence to the end they are reduced to five inches from the lower edge. these
side plank I.I. are rabbeted out one inch where they come against the front posts B.B.
the front post may also be rabbeted out one inch; the back posts are rabbeted out two
inches where they come against the plank I.I. these rabbets may also be cut large enough
to receive [illegible]. the side plank I.I. are fastened to the posts B.B. by the screws i i, the tim-
bers G.G. are each four feet [illegible] inches long four by five inches square. these pieces
G.G. are framed into the front and back posts B.B. B.B. seven and a half inches from
the lower end with a tenon passing through the posts seven or eight inches in order to
receive the [illegible] [illegible]. The [illegible] represented by the letter A. are tenoned into the
front posts B.B. with a mortise suitable to a tenon on the back posts B.B. [illegible]. the
rabbet for the front shute board to the spike cylinder Fig 1. M. M. rabbets for the back
shute board to the spike cylinder Fig 1. and front shute board to the notched bar cyl-
inder Fig 3. The shute board M. may be used to the spike cylinder Fig 1. when thrash-
ing grain the clover seed off the stalk. or it may be used as the front shute board to the
notched bar cylinder Fig 3 when thrashing clover seed out of the head. [illegible] back shute board

9741X to the notched bar cylinder Fig 3 when threshing clover seed out of the [illegible]. [illegible] foot
board [illegible] under the timber F. resting on the timber G. The two sides of this box Fig 6
may be framed together by three pieces of timber each four inches square one piece framed
through the back posts B,B. three and a half inches from the lower end: the other piece
framed through the front posts B,B, twelve and a half inches from the lower ends
the tenons of these two pieces coming through five or six inches so as to receive the keys
D,D. H, a piece of timber framed in the two side plank I,I, between the two cylinders
with a short tenon not reaching through; and the box may be drawn together by the screws
r, r. Fig 1 represents the spike cylinder which may be used for threshing clover seed off
the stalk and all kinds of small grain as wheat &c consists of three wooden heads fif-
teen inches in diameter into which are let in level with the surface four Locust
staves C,C, two feet eight inches long three and a half by three inches square which
are held together in the middle by two iron rods v,v, and fastened to the staves C.C.
by means of screws; there may be either three four or five screws through each of the staves
C. in order to prevent the staves from splitting when driving in the spikes J. which
are one inch and three fourths in length half inch by five eighths square at the stave
gradually tapering to one fourth by three eighths of an inch at the end. the spikes in
the concave Fig 5 of the same dimensions which spikes have a considerable bend, in
order that the straw may the more readily leave the cylinder when through the
concave Fig 5. An iron band should placed on each end of the cylinder for the
purpose of holding the staves C. in their places. Fig 5 concave of the spike cylinder
Fig 1. is composed of Locust staves two and a half inches thick and may be varied
from ten to twenty inches in width with a circular tenon suitable suitable to a
circular rabbet in the side plank of the box Figure 6; the tenons may be one
inch and a fourth thick and one inch long. Figure 3 represents the notched bar cylin-
der which is composed of three or four wooden heads sixteen inches in diameter and
[illegible] wrought iron bars y, from three eighths to five eighths of an inch thick and
from an inch and a fourth to two inches in width, these bars are to be let in within
one fourth of an inch with the surface of the head, which that fourth is to be notched
down the width of the band nearly level with the heads so that when the bands
are on the ends of the cylinder they will bind harder on the bars than on the heads.
these bars are held together in the middle of the cylinder Fig 3 by the iron rods
N, these rods may be fastened to the bars by rivets or screws. these bars have notch
es

9741X or from one fourth to half an inch in depth standing in a screw position or mit-
ring across the bars these notches may be cut square on both sides or square on one
side and flaring on the other side. Figure 4 concave of the notched bar cylinder
Fig 3 is composed of two circular pieces b, b, of white oak timber, two or two and
a half inches thick and three inches wide with one end fastened to the side plank J.
of the box Fig 6. by the screws w, the other end supported by the springs e, these cir-
cular pieces b, b, are lined with plank x, x, from one inch to one inch and a half
thick on which are cast iron plates o. with notches or grooves, these circular
plank and cast iron plates are fastened to the circular pieces b, b, by the screw
h. the springs e, are fastened at one end under the timber G. with a screw or
staple passing through the eye of the screw M. which screw passes through the
timber F. to set the concave Fig 4 nearer to or farther from the notched bar cyl-
inder Fig 3. Fig. 2 cog or band wheel resting on two pieces of timber P.P. each
four inches square the outside piece P.P. resting in rabbets or notches in the blocks
held by the screws i, the inside piece is rabbeted out two inches where it comes
against the posts B. B. the posts B. B. are also rabbeted out two inches so as to
make the piece even with the posts on both sides so as to be out of the way of the
concave Fig 4. the pieces P. P. are held together by the screws a, a. these pieces may
properly be called a sliding head block, which is held to its place by the key
d, placed on the front side of the front post B. when threshing with the spike cyl-
inder Fig 1. and the key d, must be placed on the back side of the front post B.
when the head block is moved so that the cog wheel Fig 2. will gear in the pin-
ion of the notched bar cylinder Fig 3. The cylinder Figures 1 and 3. may be
varied from eighteen inches to three feet in length. The number of spikes in
the spike cylinder Fig 1 may be varied from twenty four to seventy five agree-
ably to the length of the cylinder and the number of staves may be varied from
two to six. The number of bars in the notched bar cylinder Fig 3 may be varied
from six to eighteen. H. top [illegible] to the thrash box. [illegible] that holds the staves
together in the middle of the spike cylinder. W. screws that fasten one end of the
concave of the notched bar cylinder to the side plank of the box y. wrought iron bars
of the notched bar cylinder. What we claim as our own invention in the above
described wheat and clover seed threshing machine is as follows to wit:
First the plan of working two cylinders in one box by means of a sliding head block 334. 9741X block so constructed as to work either cylinder by means of one cog or band wheel.
Secondly. The improvement of making an open cylinder by means of which it is
rendered about one half lighter and the dispensing with about two thirds of the spikes
formerly used in the common spike machine. We also claim the invention of
using curved instead of straight spikes as heretofore used in threshing machines.
Thirdly. The notched bar cylinder we claim as our invention in toto Witnesses
Isaac Hardesty
John E. Hardesty Jacob Barley
John Sprinkle B, B, posts to the thrash box. C. timbers framing the front and back posts to
gether at the lower ends. D.D.D.D. tenons of the timbers framing the box together
also the keys. E. staves in the spike cylinder. F timber that holds the spring
screws. G. timber that holds the ends of the springs. H. timber framed into
the side plank between the two cylinders. I side plank of the thrash box
K: screws that hold the grooved cast iron plates and the circular plank
on the circular pieces b, b, L back shute board to the notched bar cylinder
M. back shute board to the spike cylinder and front shute board to the notched
bar cylinder. N rods that hold the notched bars together in the middle of the cyl
inder. P sliding head block on which the cog or band wheel rests. R. front shute
board to the spike cylinder S. spikes in the cylinder and concave. T feeders
foot board. a. screw that holds the timbers or sliding head block together on
which the cog or band wheel rests. b. circular pieces on which the circular
plank and grooved cast iron plates are screwed, d. key that holds the sliding
head block to its place when threshing with either cylinder. e. springs on
which the concave rests. i: screws that hold the side plank to the posts, also
the blocks with a rabbet in which the sliding head block moves. m. spring
screws. n. circular plank under the grooved cast iron plates. o. grooved
cast iron plates. r. large screws that hold the thrash box together between
the cylinders 1968 [illegible]

[illegible] CA

Drawing